US012548953B2

(12) United States Patent
Vrankovic et al.

(10) Patent No.: US 12,548,953 B2
(45) Date of Patent: Feb. 10, 2026

(54) HYBRID CABLE FOR REDUCING COMMON MODE NOISE IN A DISTRIBUTED DC BUS SYSTEM

(71) Applicant: Rockwell Automation Technologies, Inc., Milwaukee, WI (US)

(72) Inventors: Zoran Vrankovic, Greenfield, WI (US); Gary L. Skibinski, Milwaukee, WI (US); Sooraj Kv, Mequon, WI (US); Adam M. Shea, Fox Point, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 305 days.

(21) Appl. No.: 18/483,332

(22) Filed: Oct. 9, 2023

(65) Prior Publication Data

US 2025/0118935 A1 Apr. 10, 2025

(51) Int. Cl.

| | |
|---|---|
| ***H01R 13/00*** | (2006.01) |
| ***H01R 13/6591*** | (2011.01) |
| ***H01R 13/6592*** | (2011.01) |
| ***H01R 13/66*** | (2006.01) |

(52) U.S. Cl.

CPC .................. *H01R 13/6592* (2013.01); *H01R 13/65912* (2020.08); *H01R 13/6675* (2013.01)

(58) Field of Classification Search

CPC .......... H01R 13/65912; H01R 13/6675; H01R 13/6592

See application file for complete search history.

(56) References Cited

U.S. PATENT DOCUMENTS

| | | | | |
|---|---|---|---|---|
| 5,046,966 A * | 9/1991 | Snyder | H01R 13/6592 | 439/98 |
| 5,769,665 A * | 6/1998 | Neely | H01R 13/6592 | 439/607.41 |
| 6,316,723 B1 * | 11/2001 | Woehl | H01R 13/65912 | 174/40 CC |
| 10,700,455 B1 * | 6/2020 | Shen | H01R 13/502 | |
| 11,387,761 B2 | 7/2022 | Vrankovic et al. | | |
| 11,404,869 B2 | 8/2022 | Vrankovic et al. | | |
| 2003/0017730 A1 * | 1/2003 | Bassler | H01R 12/716 | 439/108 |
| 2010/0041273 A1 * | 2/2010 | Scherer | H01R 13/6597 | 439/607.01 |

(Continued)

*Primary Examiner* — Phuong Chi Thi Nguyen

(74) *Attorney, Agent, or Firm* — Boyle Fredrickson, S.C.

(57) ABSTRACT

A cable for reducing electrical noise within a distributed motor drive system includes an insulating jacket defining an outer periphery of the cable. The insulating jacket extends between a first end and a second end of the cable. At least one power conductor and a ground conductor extend between the first and second ends of the cable. A communication cable also extends between the first and second ends of the cable. The communication cable includes a second jacket having an outer surface and an inner surface, where the outer surface of the second jacket defines an outer periphery of the communication cable. At least one pair of communication conductors and a braided shield extend within the communication cable. The braided shield is positioned around the communication conductors and is electrically connected to the ground conductor at the first and second ends of the cable.

20 Claims, 7 Drawing Sheets

(56) References Cited

U.S. PATENT DOCUMENTS

| | | | | |
|---|---|---|---|---|
| 2010/0297875 | A1* | 11/2010 | Purdy ................ | H01R 13/6592 439/607.41 |
| 2015/0288108 | A1* | 10/2015 | Fischer ............. | H01R 13/6584 439/271 |

* cited by examiner

HYBRID CABLE FOR REDUCING COMMON MODE NOISE IN A DISTRIBUTED DC BUS SYSTEM

BACKGROUND INFORMATION

The subject matter disclosed herein relates to a hybrid Direct Current (DC) bus cable for a distributed motor drive system. More specifically, the hybrid DC bus cable includes both power and communications conductors within the cable, where a shield around the communications conductors is connected to a ground conductor at each end of the cable.

As is known to those skilled in the art, motor drives are used to control operation of a motor. The motor drive typically receives an Alternating Current (AC) voltage and converts the AC voltage to a DC voltage with a rectifier. The DC voltage is then converted back to an AC voltage with an inverter. The inverter controls the amplitude and frequency of the AC voltage supplied to the motor to achieve desired operation of the motor.

Historically, it was known to provide a motor drive which included the rectifier, internal DC bus, and inverter as a single package. A separate motor drive was supplied with each motor to control operation of the motor. The motor drives are typically mounted together within a control cabinet and cabling extends from each motor drive to the motor being controlled. While many motors still receive a separate motor drive, individual motor drives are not without certain challenges. The output voltage is a modulated waveform, which includes harmonic content as a result of the inverter converting the DC voltage back to the variable amplitude and variable frequency AC voltage. The cabling between the motor drive and the motor can radiate emissions at the harmonic frequencies, creating electromagnetic noise which may interfere with other electronic devices operating in the system. In addition, including a rectifier in every motor drive increases the cost of the motor drive and the size of the housing required for the motor drive.

More recently, systems have been created in which motor drives are distributed about the controlled machine or process at a location closer to, or even mounted on, the motor to be controlled. Rather than supplying utility power to each motor drive, it is preferable to transmit the DC voltage between the control cabinet and the distributed motor drive. A single rectifier unit is located in the control cabinet and is sized such that it may supply power to multiple inverters. Thus, a single rectifier may be used to convert the AC voltage from a utility supply to a DC voltage which is supplied to multiple motor drives, mounted near or on the motor.

However, distributed motor drive systems have their own challenges. Each device includes a common connection point. The common connection for the utility supply is typically connected to an earth ground. However, the rectifier front end, cabling, distributed inverters, and potential filters included in the system have floating common connections. Each of these floating common connections, while maintaining a neutral voltage for the corresponding device, may have a different voltage potential with respect to the other devices. The voltage potential between devices may reach tens and even exceed one hundred volts (100 VDC). These voltage potentials are referred to as common mode voltages and, further, may cause common mode currents to flow between devices at different voltage potentials. Historically, it has been known to use Metal Oxide Varistors (MOVs) to rapidly discharge these common mode voltages across the MOV, protecting other circuit components. However, each discharge of voltage across MOVs will cause some minor damage to the MOV. Repeated discharge of high voltages across an MOV will cause premature failure of the device and result in potential damage to other circuit components.

Thus, it would be desirable to provide an improved system for managing common mode voltages and currents between devices in a distributed DC bus system.

BRIEF DESCRIPTION

According to one embodiment of the invention, a system for reducing electrical noise with distributed motor drives includes a cable having a first end and a second end, where a first jacket defines an outer periphery of the cable. The cable includes a first DC bus conductor, a second DC bus conductor, a ground conductor, and a communication cable, where each conductor and the communication cable extend between the first end and the second end of the cable. The communication cable includes a second jacket, at least one pair of communication conductors, and a braided shield. The second jacket has an outer surface and an inner surface, where the outer surface of the second jacket defines an outer periphery of the communication cable. The braided shield is positioned around the communication conductors and extends along the inner surface of the second jacket. The braided shield is electrically connected to the ground conductor at the first end and the second end of the cable.

According to another embodiment of the invention, a cable for reducing electrical noise with distributed motor drives includes an insulating jacket, at least one power conductor, a ground conductor, and a communication cable extending between a first end and a second end of the cable. The insulating jacket defines an outer periphery of the cable. The communication cable includes a shield electrically connected to the ground conductor at the first end and the second end of the cable.

According to still another embodiment of the invention, a method for reducing electrical noise with distributed motor drives electrically connects a shield for a communication cable within each hybrid cable, selected from multiple hybrid cables, to a ground conductor within the hybrid cable. The shield is electrically connected to the ground conductor at a first end and a second end of the hybrid cable. A first distributed motor drive is electrically connected to a DC power source with a first hybrid cable, selected from the multiple hybrid cables. A second distributed motor drive is electrically connected to the first distributed motor drive with a second hybrid cable, selected from the multiple hybrid cables. Each hybrid cable includes an insulating jacket and at least one power conductor extending between the first end and the second end of the hybrid cable. The insulating jacket defines an outer periphery of the hybrid cable, and no overall shield is present within the hybrid cable to surround the at least one power conductor, the ground conductor, and the communication cable.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
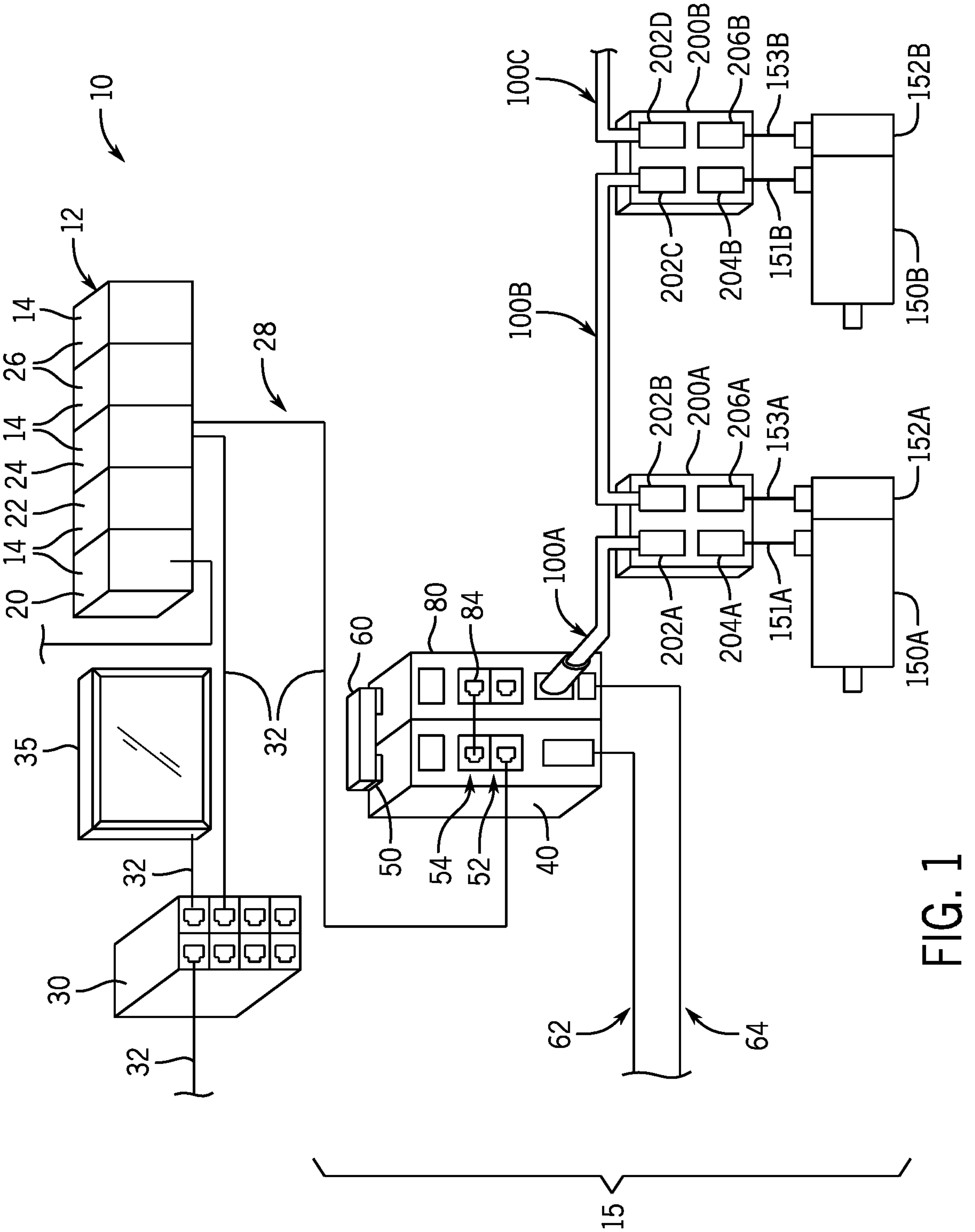
FIG. 1 is an environmental view of an exemplary industrial control system incorporating at least one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system for managing common mode voltages and currents between devices in a distributed DC bus system. A hybrid cable connects a rectifier front end with a first distributed motor drive. Additional hybrid cables connect each subsequent distributed motor drive with a prior motor drive. The hybrid cables include both power conductors and a communication cable. The hybrid cables do not require an external shield around the entire cable, reducing size and increasing flexibility of the hybrid cable. One of the conductors within the hybrid cable is a ground conductor. A shield within the communication cable is connected to the ground conductor at each end of the hybrid cable. The parallel connection via the shield on the communication cable and the ground conductor through the hybrid cable forces common mode currents that are conducted by the hybrid cable to travel along each of the parallel paths. Therefore, approximately one half of the common mode current is conducted on the ground conductor and approximately one half of the common mode current is conducted in the shield for the communication cable. Dividing the common mode current on the two parallel paths reduces the overall amplitude of common mode current present in the shield of the communication cable, decreasing the change for interference with data being transmitted via the communication cable.

Referring initially to FIG. 1, an exemplary industrial control system 10 incorporating one embodiment of the invention is illustrated. The illustrated industrial control system 10 includes an industrial controller 12 which has multiple modules 14. The modules 14 may be installed within a housing or individually on a mounting bracket, such as a DIN rail. The modules may include, for example, a power supply module 20, a processor module 22, a network module 24, and multiple I/O modules 26. The processor module 22, the network module 24, or a combination thereof may communicate on an industrial control network 28, such as ControlNet®, DeviceNet®, or EtherNet/IP®, between the industrial controller 12 and other devices connected to the industrial controller. The industrial controller 12 may be, for example, a programmable logic controller (PLC), a programmable automation controller (PAC), or the like. It is contemplated that the industrial controller 12 may include still other modules, such as an axis control module, or additional racks connected via the industrial control network 28. Optionally, the industrial controller 12 may have a fixed configuration, for example, with a predefined number of network and I/O connections.

The illustrated industrial control network 28 includes a switch 30 with a first network medium 32 connected to an external network. The external network may be an intranet, the Internet, or a combination thereof. The network medium 32 may include network cables for a wired connection, an antenna for a wireless connection, or a combination thereof. The industrial control network 28 further includes additional network media 32 connecting the switch 30 to other devices or connecting additional devices to each other. The illustrated switch 30 is connected to a Human Machine Interface (HMI) 35 and the industrial controller 12. The HMI 35 includes a screen to display information to a user. The screen may be a touch screen to provide an interface with the user as well. Optionally, other interface devices, such as a keyboard, mouse, track pad, or the like may be connected to the HMI to receive input from a user. The HMI is connected to the industrial controller 12 via the industrial control network 28 to provide a visual display of the operation of the industrial controller 12 and/or the machine or process being controlled. The HMI and the connected user interface(s) allow a technician to adjust parameters, configurations, settings, and/or programs within the industrial controller 12.

A control program executing on the industrial controller 12 determines desired operation of a machine or process controlled by the industrial controller 12. Inputs on the I/O modules 26 receive feedback signals from sensors, switches, or other devices indicating a current operating state of the controlled machine or process. In response to the inputs, the control program determines outputs or commands for desired operation of actuators on the controlled machine or process. These outputs or commands may be transmitted via discrete conductors connected between an output terminal and a device. Optionally, the commands may be transmitted in data packets via the industrial control network 28. One type of command that may be output from the industrial controller 12 is a motion command, corresponding to desired operation of a motor 150 in the controlled machine or process. The motion commands are transmitted via the industrial control network 28 from the industrial controller 12 to a motion control segment 15 of the industrial control system 10.

According to the illustrated embodiment, the motion control segment 15 includes a Rectifier Front End (RFE) 40, a Power Interface Module (PIM) 80, multiple distributed motor drives 200A, 200B, and multiple motors 150A, 150B. The RFE 40 receives a three-phase AC voltage input 62 and converts the AC voltage to a DC voltage. The RFE 40 may be a passive rectifier with a diode bridge that converts the AC voltage to the DC voltage. Alternately, the RFE 40 may be an active rectifier with controlled switching devices, such as power metal-oxide semiconductor field-effect transistors (MOSFETs). The DC voltage is passed between the RFE 40 and the PIM 80 via a DC bus connector 60. The RFE 40 is further configured to connect to the network module 24 via the industrial control network 28 at a first port 52. A second port 54 of the RFE 40 is connected to one of the network ports 84 on the PIM 80. The PIM 80 receives a control voltage 64 and selectively provides the control voltage or the DC bus voltage to each of the distributed motor drives 200. The PIM 80 also passes motion commands from the industrial network 28 to the distributed motor drives 200. A first hybrid cable 100A extends between the PIM 80 and the first motor drive 200A. Additional hybrid cables 100B, 100C extend between the first motor drive 200A and each subsequent motor drive 200B. The distributed motor drives 200 control operation of the motors 150 responsive to the motion commands. Each distributed motor drive 200 may be integrated into the motor, i.e., an integrated motor drive (IMD) or located on or next to the motor drive, i.e., a near motor drive (NMD). Operation of the motion control segment 15 is discussed in more detail below.

When a reference numeral is referred to herein without a following letter, the reference numeral refers to a single element or describes plural elements generally. A reference numeral with a following letter refers to a specific element selected from plural elements. For example, when motor drive 200 is utilized, this refers generally to each of motor drives described herein. When motor drive 200A is used, this refers to a first motor drive, and when motor drive 200B is used, this refers to a second motor drive, where the first and second motor drives are separate instances of a motor drive 200.

Figure 3:
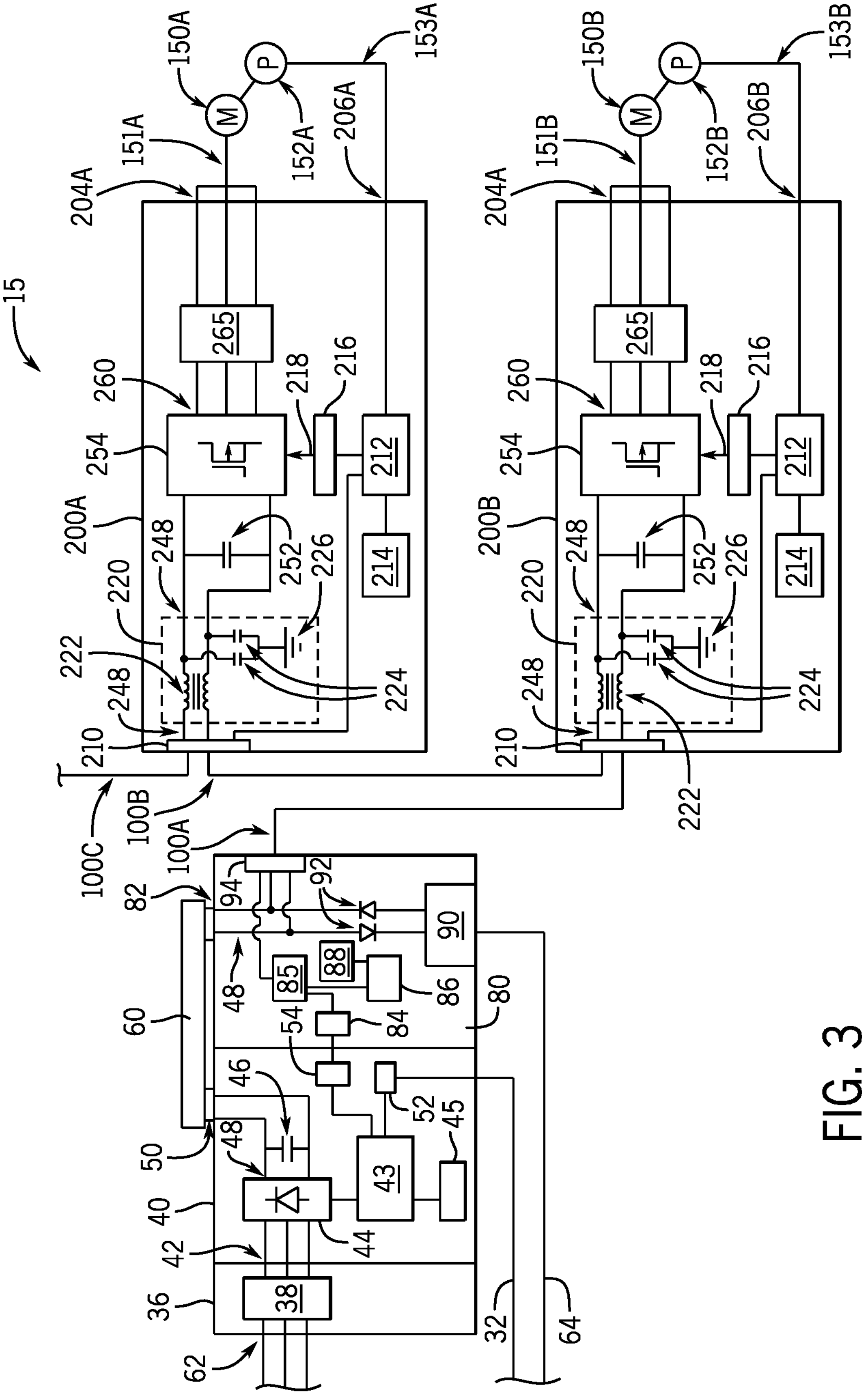
FIG. 3 is a schematic representation of a motion control segment from FIG. 1.
Figure 4:
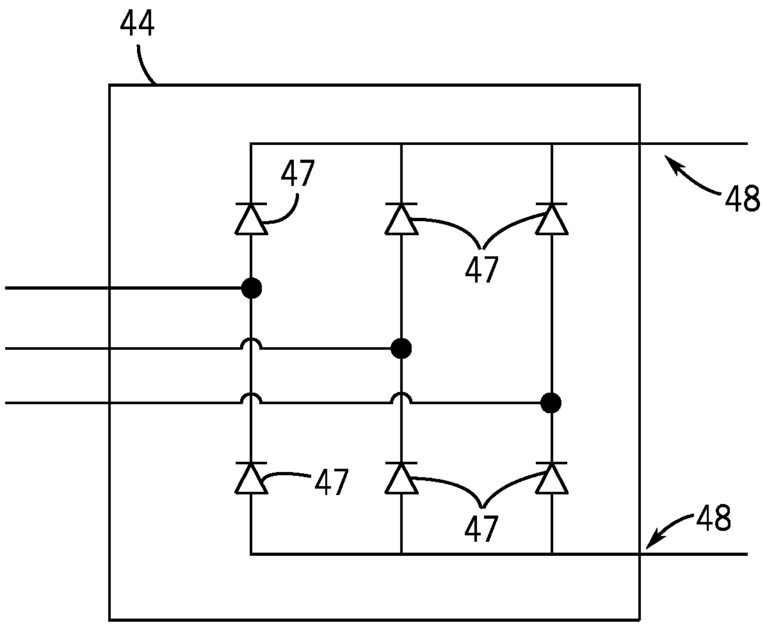
FIG. 4 is a partial schematic representation of a rectifier section for a Rectifier Front End (RFE) from FIG. 3.

With reference next to FIG. 3, additional detail of the motion control segment 15 is illustrated. The RFE 40 is configured to receive a three-phase AC voltage 62 at an input 42 to the RFE. An Electromagnetic Interference (EMI) filter 36 may be included prior to the RFE 40, where the filter section 38 includes inductors connected in series with each phase of the AC voltage 62 and capacitors connected in parallel between each phase of the AC voltage 62 and a common connection. The EMI filter 36 suppresses at least a portion of conducted emissions entering and exiting the RFE 40. The filtered three-phase AC voltage is then provided to a rectifier section 44 in the RFE 40. With reference also to FIG. 4, the illustrated RFE 40 is a passive RFE with a rectifier section 44 that includes a set of diodes 47 forming a diode bridge that rectifies the three-phase AC voltage to a DC voltage on the DC bus 48. Optionally, the RFE 40 may be an active rectifier with a rectifier section 44 that includes other solid-state devices including, but not limited to, thyristors, silicon-controlled rectifiers (SCRs), insulated-gate bipolar transistors (IGBTs), power metal-oxide semiconductor field-effect transistors (MOSFETs), or other transistors or solid-state devices to convert the input power 62 to a DC voltage for the DC bus 48.

The RFE 40 also includes a DC bus capacitance 46 connected between the positive and negative rails of the DC bus 48 to reduce the magnitude of the ripple voltage resulting from converting the AC voltage to a DC voltage. It is understood that the DC bus capacitance 46 may be a single capacitor or multiple capacitors connected in parallel, in series, or a combination thereof. According to one embodiment of the invention, the positive rail of the DC bus 48 is at a voltage potential generally equal to or boosted above the magnitude of the peak of the AC input voltage and the negative rail of the DC bus 48 is at a voltage potential at zero volts, where the negative rail may be a floating common or tied to an earth ground. According to the another embodiment of the invention, the DC bus capacitance 46 may be arranged in a split-bus configuration, such that a first portion of the DC bus capacitance 46 is connected between the positive rail and a ground connection, and a second portion of the DC bus capacitance 46 is connected in series with the first portion of the DC bus capacitance between the ground connection and the negative rail. The total voltage potential across the DC bus 48 in the split bus configuration remains generally equal to or boosted above the magnitude of the peak of the AC input voltage, but the voltage potential across each portion of the capacitance 46 is one-half of the total DC bus voltage. The DC bus 48 is electrically connected to a DC bus stab 50 mounted on one surface of the RFE 40. A DC bus connector 60 extends between the DC bus stab 50 and at least one additional device to conduct the DC voltage to the additional device.

The RFE 40 further includes a control circuit used to control operation of the rectifier. According to the illustrated embodiment, the control circuit includes a processor 43 and a memory 45. One or more modules are used to control operation of the RFE 40. The modules may be programs stored in the memory 45 and executed on the processor 43, logic circuits, or a combination thereof. The memory 45 is configured to store data and programs, which include a series of instructions executable by the processor 43. It is contemplated that the memory 45 may be a single device, multiple devices, or incorporated, for example, as a portion of another device such as an application specific integrated circuit (ASIC). The processor 43 is in communication with the memory 45 to read the instructions and data as required to control operation of the RFE 40. The processor 43 receives input signals from input terminals, communication circuits, such as the industrial control network 28, and the like, which include, for example, an enable signal, a disable signal, or other command signals defining desired operation of the RFE 40. The processor 43 similarly receives feedback signals from sensors indicating the present operation of the RFE 40. The feedback signals may include, but are not limited to, the magnitude of voltage and/or current present from the input power 62 or on the DC bus 48. The processor 43 is further configured to receive data packets from the network medium 32 at a first port 52. The processor 43 determines whether the data packet is intended for the RFE 40 or a subsequent device in the industrial control network 28. The processor 43 may generate new data packets or retransmit data packets intended for subsequent devices via the second port 54.

According to the illustrated embodiment, the motion control segment 15 further includes a PIM 80 connected to the RFE 40. The DC bus connector 60 extends between the DC bus stab 50 for the RFE 40 and a second DC bus stab 82 on the PIM 80, supplying the DC bus voltage to the PIM. The PIM 80 is configured to supply either a control voltage or the DC bus voltage over the shared DC bus to multiple distributed motor drives 200. The PIM 80 performs similar functions to the Apparatus for Distributing DC Bus Power and Control Power Over Common Conductors in a Distributed DC Bus System as described in U.S. Pat. No. 11,404,869, which is commonly owned by Rockwell Automation Technologies and which is incorporated herein by reference in its entirety. The system described in the '869 patent discusses the distribution of the control voltage or the DC bus voltage over the shared DC bus being performed by the rectifier front end. In the present application, the distribution of the control voltage or the DC bus voltage over the shared DC bus is being performed by the PIM 80.

The PIM receives a control voltage 64 for distribution to each of the motor drives 200. A voltage regulation section 90 receives the control voltage 64 input and generates a desired control voltage for distribution over the DC bus 48. The control voltage 64 received at the voltage regulation section 90 may be a nominal DC voltage in a range, for example, between 24 VDC and 60 VDC. The voltage regulation section 90 may step up or step down this input voltage from one DC voltage to another DC voltage. Optionally, the control voltage 64 received at the voltage regulation section 90 may be an AC voltage, such as 110 VAC. The voltage regulation section 90 may convert this AC voltage to the desired DC voltage for distribution on the DC bus 48.

According to the illustrated embodiment, a pair of diodes 92 are included between the voltage regulation section 90 and the DC bus 48. Optionally, a single blocking diode may be provided between the positive output terminal of the voltage regulation section and the positive rail of the DC bus. The pair of diodes 92 allow the DC control voltage output from the voltage regulation section 90 to be present on the DC bus 48 when the DC bus voltage output from the RFE 40 is not present and to disconnect the voltage regulation section 90 from the DC bus 48 when the DC bus voltage output from the RFE 40 is present. The DC bus voltage is greater than the DC control voltage output from the voltage regulation section 90. The magnitude of the DC bus voltage is approximately equal to the peak value of the AC input voltage. For example, a 230 VAC input voltage yields a DC bus voltage of about 325 VDC and a 460 VAC input voltage yields a DC bus voltage of about 650 VDC. In contrast, the nominal DC control voltage is in a range between 24 VDC and 60 VDC. When the DC bus voltage is present, the pair of diodes 92 are reverse-biased such that no current is conducted from the voltage regulation section 90 and the voltage present on the DC bus 48 is the DC bus voltage. When the DC bus voltage is not present, the pair of diodes 92 are forward-biased such that current is conducted from the voltage regulation section 90 and the voltage present on the DC bus 48 is the DC control voltage.

With reference again to FIG. 3, the motion control segment 15 also includes a first motor drive 200A and a second motor drive 200B. Each motor drive receives power and data via a hybrid cable 100. The motor drives 200 include an input connector 210 which transfers the power to the DC bus 248 within the motor drive and which transfers data packets received via the hybrid cable 100 to the processor 212.

A common mode filter 220 is connected on the DC bus 248 at the input of each motor drive 200. The common mode filter 220 includes a DC common mode inductor 222, also referred to as a DC common choke, connected in series with the DC bus 248. Conductors for both the positive rail and the negative rail of the DC bus 248 are wrapped around a common core and connected in series with each rail. The common mode filter 220 also includes a pair of common mode capacitors 224. A first common mode capacitor 224 is connected between the positive rail of the DC bus and a common point for the common mode filter 220. A second common mode capacitor 224 is connected between the negative rail of the DC bus and the common point for the common mode filter. The two common mode capacitors 224 are preferably equal in capacitance and create a balanced voltage potential across each capacitor. The common point is connected to the common connection of the motor drive 200, establishing a flow path for common mode currents to circulate within the motor drive. According to the illustrated embodiment, the common connection for the common mode filter 220 is connected to a ground connection 226. The output of the common mode filter 220 is a filtered DC bus voltage on the DC bus 248. A DC bus capacitance 252 is connected between the positive and negative rails of the DC bus 248 between the common mode filter 220 and an inverter section 254. It is understood that the DC bus capacitance 252 may be a single capacitor or multiple capacitors connected in parallel, in series, or a combination thereof. Although not illustrated, it is contemplated that the still additional filters may be included on the DC bus. A System and Method for Sinusoidal Output and Integrated EMC Filtering in a Motor Drive is described in U.S. Pat. No. 11,387,761, which is commonly owned by Rockwell Automation Technologies and which is incorporated herein by reference in its entirety. The '761 patent describes still additional filters which may be utilized to establish additional circulation paths for common mode currents within the motor drive 200.

Figure 5:
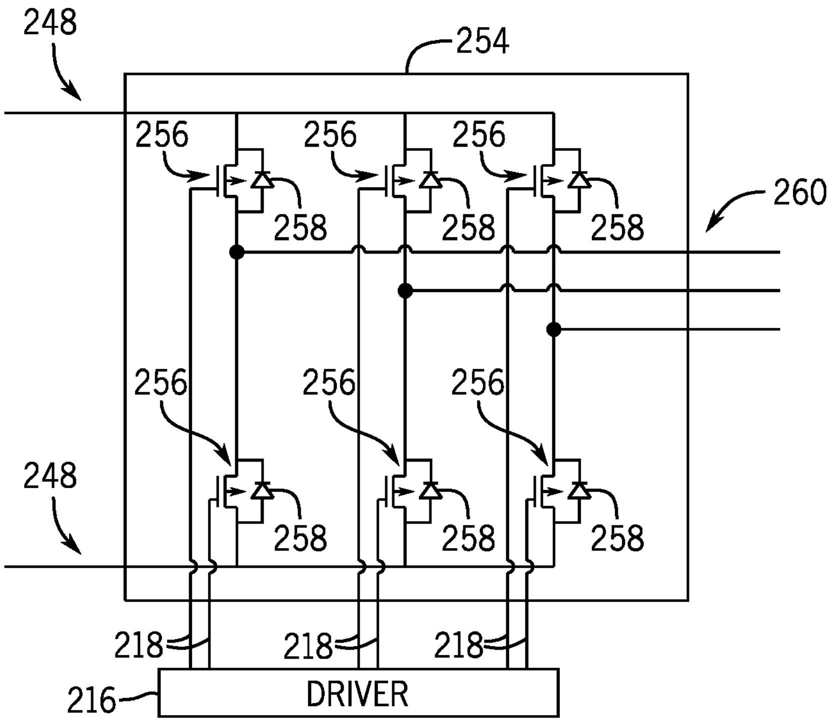
FIG. 5 is a schematic representation of an inverter section for a motor drive from FIG. 3.

The inverter section 254 consists of switching elements, such as transistors, thyristors, or SCRs as is known in the art. With reference also to FIG. 5, the exemplary inverter section 254 includes a power metal-oxide-semiconductor field-effect transistor (MOSFET) 256 and a reverse connected device 258, which may be a free-wheeling diode or a MOSFET's inherent body diode, connected in pairs between the positive rail of the DC bus 248 and each phase of the output 260 as well as between the negative rail of the DC bus and each phase of the output. Each of the transistors 256 receives switching signals 218 to selectively enable the transistors 256 and to convert the DC voltage from the DC bus 248 into a controlled three phase output voltage to the motor 150. When enabled, each transistor 256 connects the respective rail of the DC bus 248 to one phase of the output 260.

The motor drive 200 may also include one or more filters 265 connected to the output 260 of the inverter section 254. Several exemplary filters are shown in the '761 patent. At least one of the filters is a common mode filter including a connection to the common point within the motor drive 200. As indicated above, the common point for the common mode filter 220 at the input of the motor drive 200 is a ground connection 226. The common mode filter on the output of the motor drive 200, therefore, is similarly connected to the ground connection. The shared connection between a common mode filter 220 on the input and another common mode filter 265 on the output of the motor drive 200 establishes a circulation path within the motor drive 200 for at least a portion of the common mode currents to circulate.

A processor 212 and a driver circuit 216 may include and manage execution of modules used to control operation of the motor drive 200. The illustrated embodiment is not intended to be limiting and it is understood that various features of each module may be executed by another module and/or various combinations of other modules may be included in the processor 212 without deviating from the scope of the invention. The modules may be stored programs executed on one or more processors, logic circuits, or a combination thereof. The processor 212 may be implemented, for example, in a microprocessor, application specific integrated circuit (ASIC), field programmable gate array (FPGA), or other such customizable device. The motor drive 200 also includes a memory device 214 in communication with the processor 212. The memory device 214 may include transitory memory, non-transitory memory or a combination thereof. The memory device 214 may be configured to store data and programs, which include a series of instructions executable by the processor 212. It is contemplated that the memory device 214 may be a single device, multiple devices, or incorporated, for example, as a portion of another device such as an application specific integrated circuit (ASIC). The processor 212 is in communication with the memory 214 to read the instructions and data as required to control operation of the motor drive 200.

According to one embodiment of the invention, the processor 212 receives a reference signal identifying desired operation of the motor 150 connected to the motor drive 200. The reference signal may be, for example, a torque reference (T*), a speed reference (ω*), or a position reference (θ*). The processor 212 also receives feedback signals indicating the current operation of the motor drive 200. The motor drive 200 may include a voltage sensor and/or a current sensor operatively connected to the DC bus 248 and generating a feedback signal corresponding to the magnitude of voltage and/or current present on the DC bus. The motor drive 200 may also include one or more voltage sensors and/or current sensors on each phase of the AC output voltage generating a feedback signal corresponding to the magnitude of voltage and/or current present at the output 204 of the motor drive 200.

The processor 212 utilizes the feedback signals and the reference signal to control operation of the inverter section 254 to generate an output voltage having a desired magnitude and frequency for the motor 150. The processor 212 may generate a desired output voltage signal to the driver circuit 216. The driver circuit 216, in turn, generates the switching signals 218, for example, by pulse width modulation (PWM) or by other modulation techniques. The switching signals 218 subsequently enable/disable the transistors 256 to generate the desired output voltage for the motor 150. Motor cables 151 are connected between each motor drive 200 and the motor 150 to deliver the desired voltage to the motor 150. A position feedback device 152, such as an encoder or resolver, is connected to the motor and generates a feedback signal corresponding the angular position of the motor 150. A position feedback cable 153 extends between the position feedback device 152 and a connector 206 on the motor drive to deliver the angular position information from the position feedback device to the motor drive 200.

Figure 2:
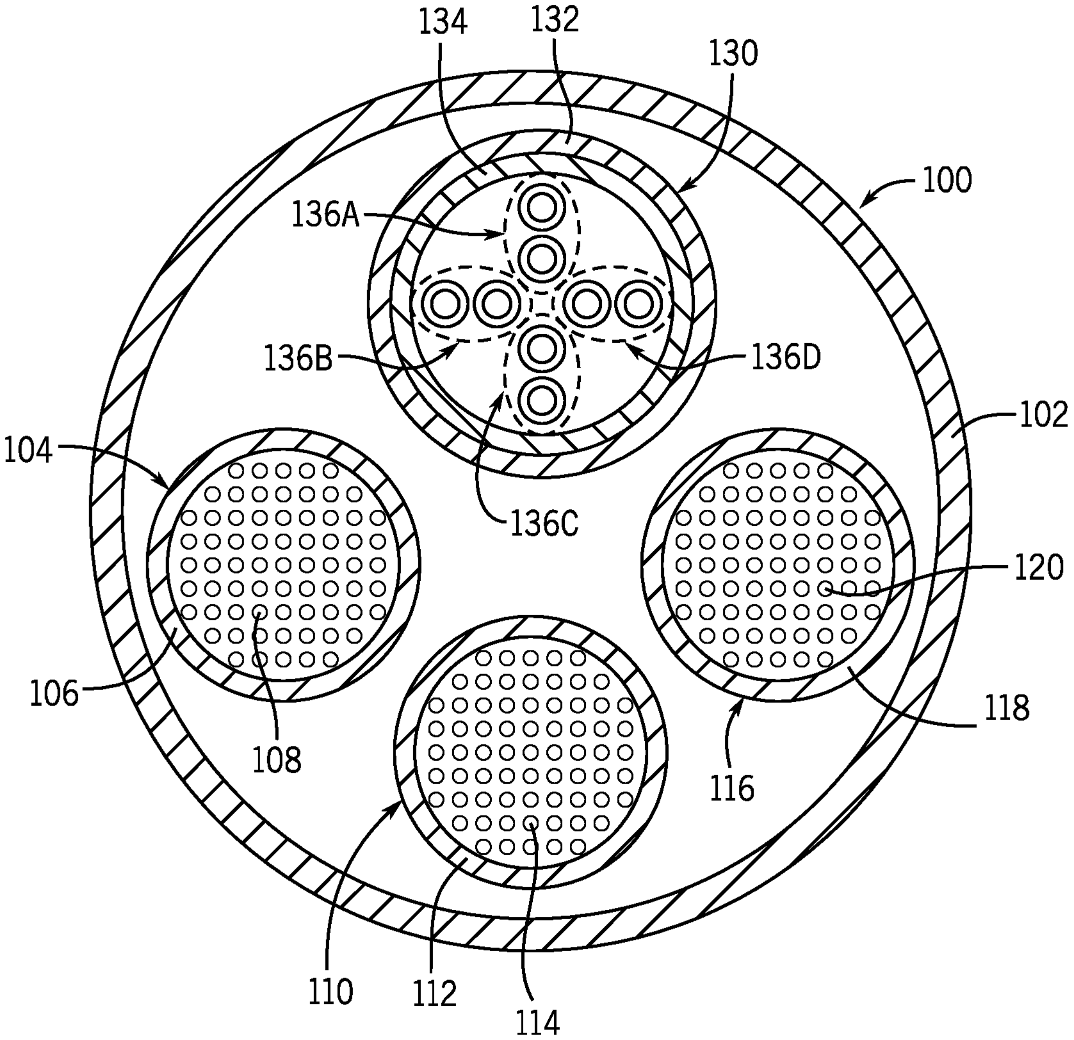
FIG. 2 is a sectional view of a hybrid cable incorporating one embodiment of the present invention.

Turning next to FIG. 2, a sectional view of one embodiment of the hybrid cable 100 connecting the PIM 80 to a distributed motor drive 200 and connecting successive distributed motor drives 200A, 200B to each other is illustrated. The cable 100 has an outer jacket 102 made of an insulating material. The outer jacket 102 has an inner surface and an outer surface, where the outer surface defines an outer periphery of the cable 100. Multiple power conductors extend within the hybrid cable 100. According to the illustrated embodiment, three power conductors are included, where two power conductors are used to conduct a DC bus voltage and a third power conductor provides a ground connection. The first power conductor 104 is a first DC bus conductor and includes an insulating jacket 106 and at least one conductor 108 within the insulating jacket 106. As illustrated, the first DC bus conductor 104 is a multi-stranded cable with multiple conductors 108. Optionally, the first DC bus conductor may be a solid-core wire having a single conductor 108. The second power conductor 110 is a second DC bus conductor and includes an insulating jacket 112 and at least one conductor 114 within the insulating jacket 112. As illustrated, the second DC bus conductor 110 is a multi-stranded cable with multiple conductors 114. Optionally, the second DC bus conductor may be a solid-core wire having a single conductor 108. The third power conductor 116 is a ground conductor and includes an insulating jacket 118 and at least one conductor 120 within the insulating jacket 118. As illustrated, the ground conductor 116 is a multi-stranded cable with multiple conductors 120. Optionally, the ground conductor may be a solid-core wire having a single conductor 120.

The hybrid cable 100 also includes a communication cable 130 extending within the hybrid cable. According to the illustrated embodiment, the communication cable 130 is a four pair Ethernet cable. The communication cable 130 includes an insulating jacket 132 having an inner surface and an outer surface. The outer surface of the insulating jacket 132 defines an outer periphery of the communication cable 130. A braided shield 134 encircles each of the communication conductors and is positioned adjacent to the inner surface of the insulting jacket 132. Optionally, other shield conductors may be utilized. The shield 134 may be, for example, a foil shield encircling each of the communication conductors or an additional, multi-stranded conductor extending the length of the communication cable 130. A first pair of communication conductors 136A includes a twisted pair of conductors. Each conductor of the twisted pair may be a multi-stranded or solid core conductor. The twisted pair may also include a jacket around the pair of conductors. The cable further includes a second pair of communication conductors 136B, a third pair of communication conductors 136C, and a fourth pair of communication conductors 136D. Each additional pair of communication conductors similarly includes a twisted pair of conductors and may be a multi-stranded or solid core conductor. Each additional pair of communication conductors may also include a jacket around the pair of conductors.

Figure 7:
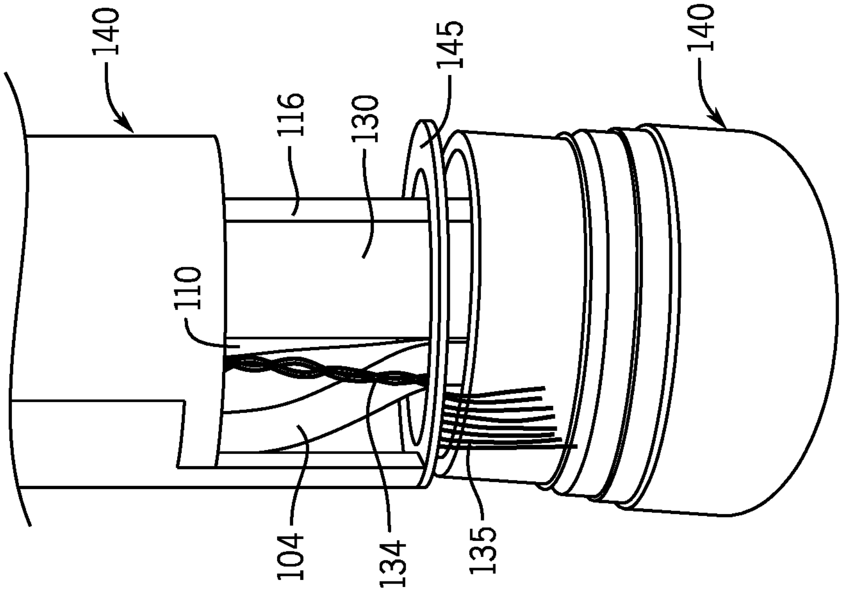
FIG. 7 is a side view of a hybrid cable of FIG. 1 illustrating another connection between a ground conductor and a shield in a communication cable.
Figure 6:
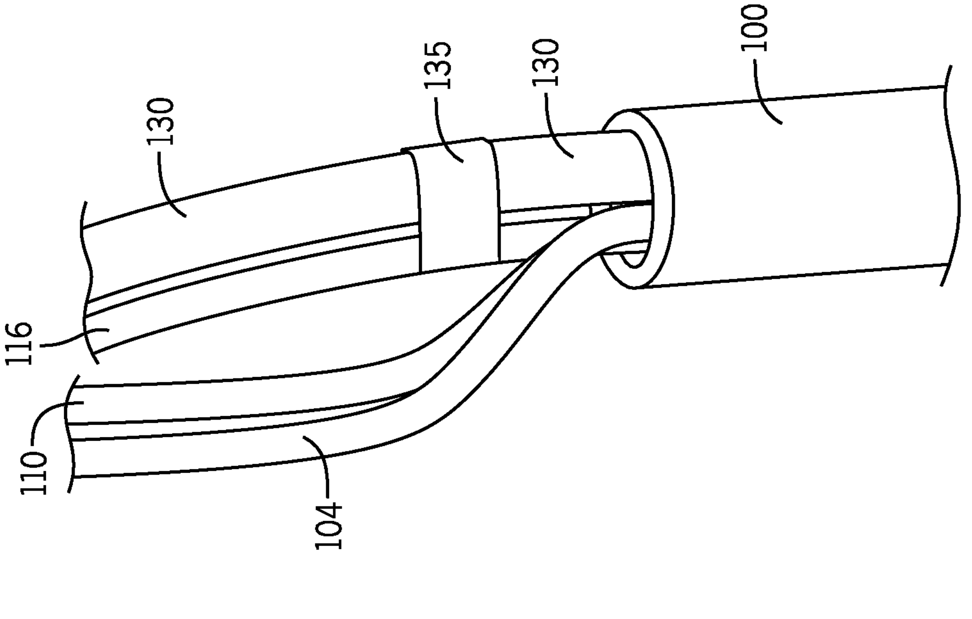
FIG. 6 is a side view of a hybrid cable of FIG. 1 illustrating one connection between a ground conductor and a shield in a communication cable.

With reference next to FIGS. 6 and 7, each hybrid cable 100 includes a connection 135 between the shield 134 in the communication cable 130 and the ground conductor 116 at each end of the hybrid cable 100. In FIG. 6, a first connection 135 is created by first stripping away a portion of the insulating jacket 132 on the communication cable 130 and a portion of the insulating jacket 118 on the ground conductor 116. The portions of each cable where the insulating jackets are removed are positioned adjacent each other. A foil material is wrapped around the braided shield 134 and the conductor(s) 120 in the ground conductor 116. The foil material may be secured by adhesive, solder, heat shrinkage, by wrapping multiple layers of the foil around the conductors, or by any other suitable method. The foil material is a conductive material such as copper, silver, gold, or any other conductive material. Optionally, other conductors, such as bare conductors or directly soldering the shield 134 and conductors 120 together may be utilized. The connection 135 between the shield 134 and conductors 120 is an electrical connection allowing common mode currents to evenly flow between the two paths. After making the connection 135 between the shield 134 and conductors 120, additional insulating material, such as electrical tape, rubber tape, heat-shrinkable tubing, or the like may be placed around the connection 135 to prevent inadvertent electrical connections from being established.

In FIG. 7, a second connection 135 is created by unravelling a portion of the braided shield 134 from around the communication cable 130 and twisting the braids to form a multi-stranded conductor. The multi-stranded conductor is secured within a ring 145 which forms a portion of the housing 140 for a connector at one end of the hybrid cable 100. The conductor(s) 120 within the ground conductor 116 are similarly connected to the ring 145 either directly or via the housing. The ring 145 is conductive and establishes the electrical connection between the ground conductor 116 and the shield 134 for the communication cable 130. The connection 135 shown in FIG. 7 similarly establishes an electrical connection between the shield 134 and conductors 120 allowing common mode currents to evenly flow between the two paths.

In operation, the hybrid cable 100 reduces electrical noise such as common mode currents flowing on the shield conductor 134 in a communication cable 130. With reference again to FIG. 1, a first hybrid cable 100A is connected between the PIM 80 and a first motor drive 200A. A second hybrid cable 100B is connected between the first motor drive 200A and a second motor drive 200B. A third hybrid cable 100C is shown from the second motor drive 200B to still another location in the motion control segment 15. Each hybrid cable 100 conducts both power and data communication between devices.

Figure 9:
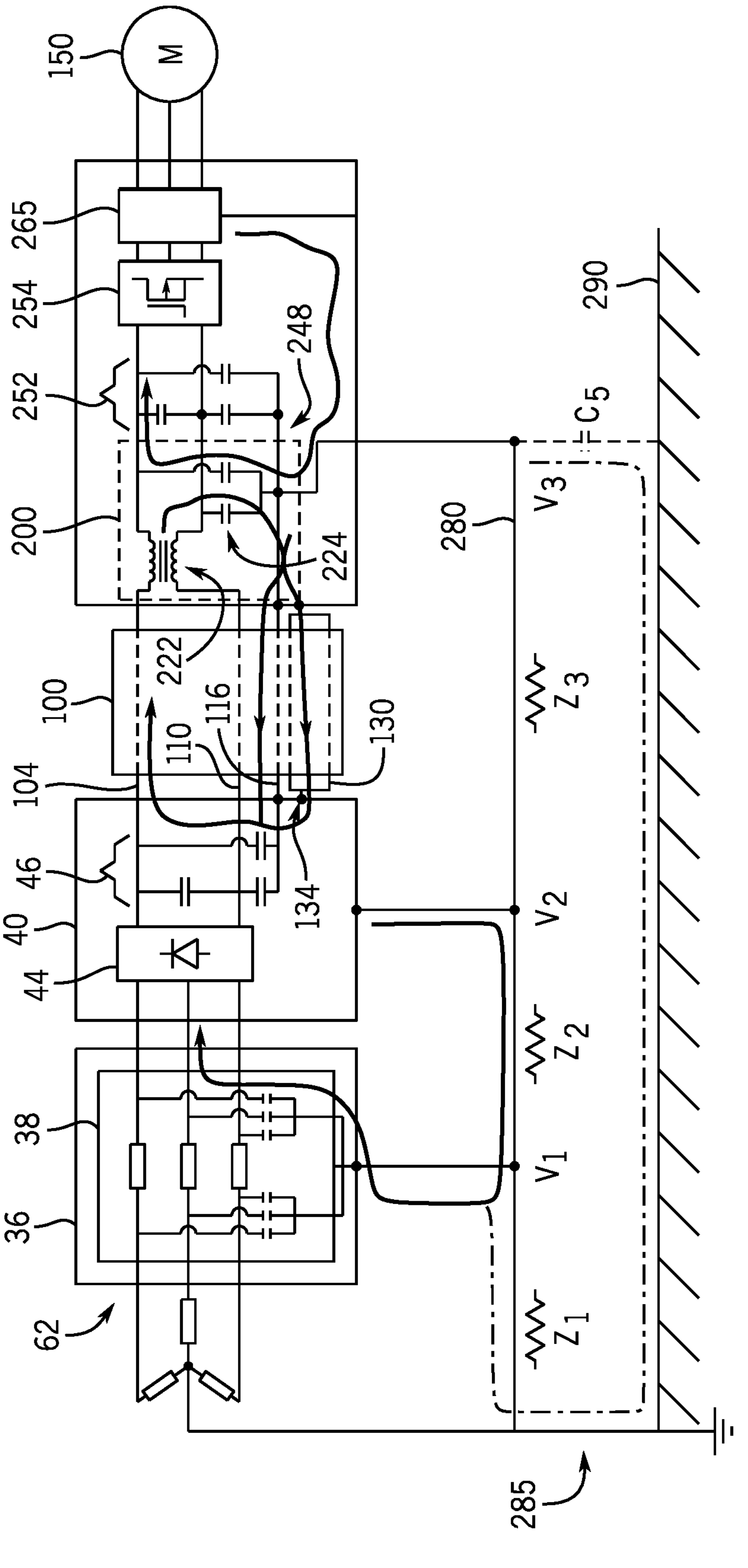
FIG. 9 is a schematic representation of the motion control segment from FIG. 1 further illustrating at least a portion of the common mode conduction paths.

With reference to FIG. 9, a schematic representation of voltage potentials present in the industrial control system 10 is illustrated. In a given industrial control system 10, there is typically a single, earth ground connection 285 established. As illustrated, an electrical connection is made between a center tap of a transformer supplying the three-phase AC voltage input 62 to the EMI filter 36. The earth ground connection 285 is between a neutral point 280 for the system and earth ground 290. In an ideal system, the voltage potential present on the neutral point 280 would remain zero volts and equal to the voltage potential present on the earth ground 290. As shown in FIG. 9, however, each cable includes some impedance, illustrated as $Z_1$, $Z_2$, and $Z_3$. As a result, a difference in voltage potential exists between devices interconnected to the neutral point 280 as shown by the voltage potentials $V_1$, $V_2$, and $V_3$. Thus, when each device 36, 40, 200 is connected to the neutral point 280 some common mode current may circulate between devices. In addition, parasitic capacitance may be present within the industrial control system 10. One such parasitic capacitance is illustrated as a stray capacitance, Cs, present between the neutral point 280 and the earth ground 290. A capacitance appears as an impedance to an alternating current and establishes a conduction path for stray alternating current to flow.

Inverter sections 254 in a motor drive 200 create the desired variable amplitude and variable frequency AC voltage by modulating the DC voltage present on the DC bus 248 into the DC AC voltage. Modulation requires rapid switching of the transistors 256 in the inverter module to selectively connect either the positive rail or the negative rail of the DC bus 248 to one phase of the output from the inverter. The output, therefore, is a series of square waves, alternating connected between the full voltage present on one of the rails of the DC bus and zero volts. These square waves approximate a sinusoidal output voltage by varying the duration within each switching period for which the full voltage is connected to the output. When the output is connected for a small portion of a switching period, the average voltage output over that switching period is low. When the output is connected for a large portion of the switching period, the average voltage output over that switching period approaches the voltage level present on the DC bus 248. The switching, however, creates large changes in voltage at a high frequency or, in other words, the modulated output voltages have a large dv/dt. Thus, an inverter section 254 generates a high dv/dt voltage and the current through a parasitic capacitance is equal to the capacitance value multiplied by the dv/dt present across the capacitance. The modulation in inverter sections 254 tends to establish common mode currents within the motor drive 200 and/or the industrial control system 10 which must be addressed.

The motion control segment 15 of the present invention is configured to circulate common mode currents locally within devices, to reduce the overall common mode current circulating within the system. Each distributed motor drive 200, for example, includes the common mode filter 220 discussed above. The common mode capacitors 224 at the input are connected to a common connection point as a common mode filter 265 at the output of the motor drive 200 to create a common mode conduction path within the motor drive through the common mode filters 220, 265 and the DC bus 248. Additionally, the common mode inductor 222 restricts the common mode code from entering the hybrid cable 100. By creating a circulation path within the motor drive and restricting the conduction path between the motor drive 200 and the hybrid cable, common mode currents generated within the motor drive 200 are primarily contained within the motor drive 200.

Because the common mode currents generated within the motor drive 200 are minimized by filtering within the motor drive, no overall shield is required within the hybrid cable 100. Historically, an overall braided shield would be included in a cable connecting devices within the motion control segment 15. Elimination of the overall shield reduces cost, reduces the diameter, and increases flexibility of the hybrid cable 100.

Figure 8:
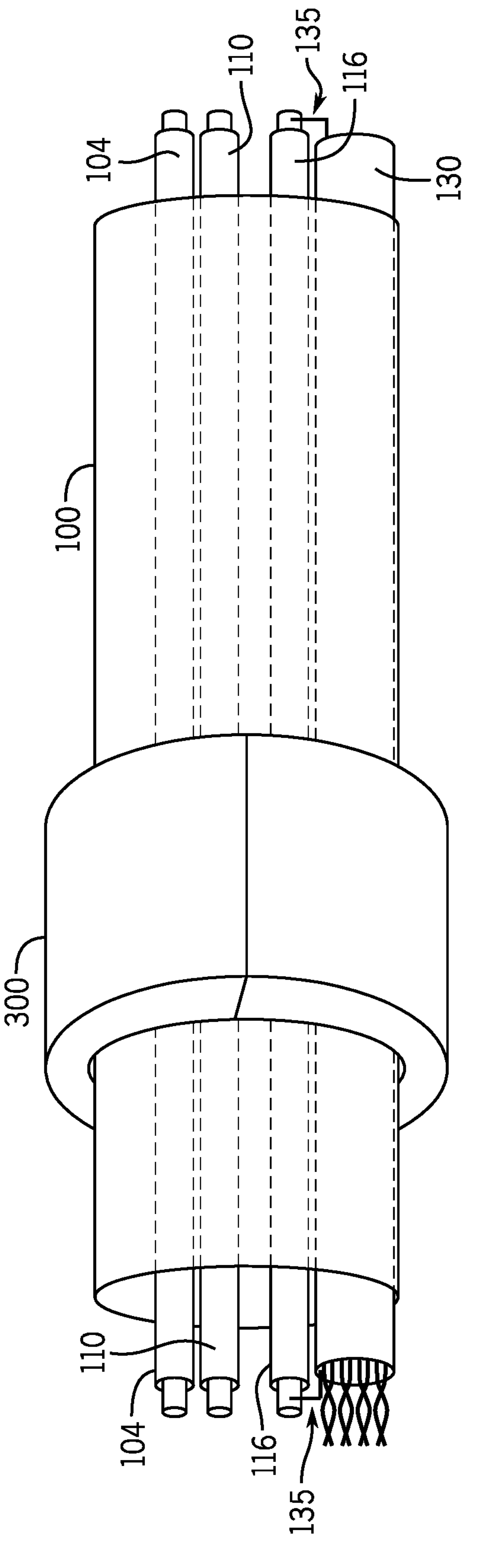
FIG. 8 is a side view of a hybrid cable of FIG. 1 with an external common mode core mounted on the cable.

However, some common mode current is still present within the hybrid cable 100. The construction of the hybrid cable 100 divides the common mode current that is present within the cable between the ground conductor 116 and the shield 134 in the communication cable. With reference also to FIG. 8, it is desirable to include the ground conductor 116 adjacent to the communication cable 130. More specifically, running the ground conductor 116 parallel to the communication cable 130 and, in turn, parallel to the braided shield 134 along the interior of the communication cable minimizes stray capacitance between the ground conductor 116 and the braided shield 134. Minimizing stray capacitance between the ground conductor 116 and the braided shield 134 keeps the two conductors at the same voltage potential with respect to other stray capacitances. When the ground conductor 116 and the braided shield 134 are electrically connected at each end of the hybrid cable 100 and when the voltage potential for the two conductors is the same, the common mode current flowing through each conductor is split evenly between the two conductors. Forcing common mode currents to divide evenly between the ground conductor 116 and the braided shield 134 inhibits common mode current flow through the pairs of communication conductors 136 and reduces the potential for interference in the data being carried by the communication conductors.

The hybrid cable 100 conducts both power and data packets for the distributed motor drives 200. As discussed above, the PIM 80 may provide either a control voltage or a DC bus voltage via the power conductors 104, 110 in the hybrid cable. At least one network port 84 on the PIM 80 is connected to the RFE 40 which is, in turn, connected to the industrial controller 12. The control program executing in the processor module 22 generates motion commands for desired operation of each motor 150. The motion commands are transmitted in data packets via the industrial control network 28, to each distributed motor drive 200. Similarly, other commands, such as brake commands, and feedback data, such as position feedback data, is communicated between each distributed motor drive 200 and the industrial controller 12 via the industrial control network 28. The PIM 80 receives data packets at the network port 84. A network interface 85 within the PIM may read header data from data packets and determine whether a data packet is intended for the PIM 80 or for a motor drive. If the data packet is intended for the PIM 80, the network interface 85 transfers the data from the network port 84 to the processor 86 in the PIM. If the data packet is intended for a distributed motor drive, the network interface 85 transfers the data packet from the input port 84 to an output interface 94. The output interface 94 provides a physical connection for both data packets and power connections within the PIM 80 to the hybrid cable 100 to be transmitted via the respective communication cable or power conductors to a first distributed motor drive 200A.

In some applications, a level of noise present on the hybrid cable may be greater than desired. For example, external common mode current may be present in the ground connection. As shown in FIG. 8, an external common mode core 300 may be affixed to the exterior of the hybrid cable 100. The external common mode core 300 can prevent the external common mode current from flowing through the hybrid cable 100. The external common mode core 300 may also be desirable to reduce radiated and/or conducted emissions generated by the hybrid cable 100 from being transmitted and/or conducted to other electronic devices present near the industrial control system 10.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for reducing electrical noise with distributed motor drives, the system comprising:
- a cable having a first end and a second end, the cable further comprising:
  - a first jacket defining an outer periphery of the cable;
  - a first DC bus conductor extending between the first end and the second end of the cable;
  - a second DC bus conductor extending between the first end and the second end of the cable;
  - a ground conductor extending between the first end and the second end of the cable; and
  - a communication cable extending between the first end and the second end of the cable, the communication cable including:
    - a second jacket having an outer surface and an inner surface, wherein the outer surface of the second jacket defines an outer periphery of the communication cable,
    - at least one pair of communication conductors, and
    - a braided shield positioned around the at least one pair of communication conductors and extending along the inner surface of the second jacket, wherein the braided shield is electrically connected to the ground conductor at the first end and the second end of the cable.

2. The system of claim 1 wherein the ground conductor extends adjacent to the communication cable within the cable.

3. The system of claim 1 wherein the communication cable is a four-pair Ethernet cable.

4. The system of claim 1 further comprising a common mode core around the outer periphery of the cable.

5. The system of claim 1, wherein:
- the first DC bus conductor comprises:
  - an insulating first conductor jacket defining an outer periphery of the first DC bus conductor, and
  - at least one first conductive wire within the first conductor jacket;
- the second DC bus conductor comprises:
  - an insulating second conductor jacket defining an outer periphery of the second DC bus conductor, and
  - at least one second conductive wire within the second conductor jacket; and
- the ground conductor comprises:
  - an insulating third conductor jacket defining an outer periphery of the ground conductor, and
  - at least one third conductive wire within the third conductor jacket, and wherein the cable has no overall braided shield to enclose the first DC bus conductor, the second DC bus conductor, the ground conductor, and the communication cable.

6. The system of claim 1, wherein the cable is a first cable, the system further comprising:
- a rectifier front end operative to output a DC voltage;
- a first motor drive, wherein the first cable supplies the DC voltage from the rectifier front end to the first motor drive, the first motor drive further comprising:
  - a DC bus electrically connected to the first and second DC bus conductors for the first cable to receive the DC voltage from the rectifier front end;
  - a ground connection electrically connected to the ground conductor from the first cable; and
  - a common mode filter electrically connected between the DC bus and the ground connection for the first motor drive;

a second cable having a first end and a second end, the second cable further comprising:
a first jacket defining an outer periphery of the second cable;
a first DC bus conductor extending between the first end and the second end of the second cable;
a second DC bus conductor extending between the first end and the second end of the second cable;
a ground conductor extending between the first end and the second end of the second cable; and
a communication cable extending between the first end and the second end of the second cable, the communication cable including:
a second jacket having an outer surface and an inner surface, wherein the outer surface of the second jacket defines an outer periphery of the communication cable,
at least one pair of communication conductors, and
a braided shield positioned around the at least one pair of communication conductors and extending along the inner surface of the second jacket, wherein the braided shield is electrically connected to the ground conductor at the first end and the second end of the second cable;
a second motor drive, wherein the second cable extends between the first motor drive and the second motor drive to supply the DC voltage to the second motor drive, the second motor drive further comprising:
a DC bus electrically connected to the first and second DC bus conductors for the second cable to receive the DC voltage from the first motor drive;
a ground connection electrically connected to the ground conductor from the second cable; and
a common mode filter electrically connected between the DC bus and the ground connection for the second motor drive.

7. The system of claim 6, wherein:
the common mode filter for the first motor drive includes:
a common mode inductor connected in series on the DC bus,
a first common mode capacitor connected between a positive rail of the DC bus and a common connection point, and
a second common mode capacitor connected between a negative rail of the DC bus and the common connection point, wherein the common connection point for the common mode filter for the first motor drive is electrically connected to the ground connection in the first motor drive; and
the common mode filter for the second motor drive includes:
a common mode inductor connected in series on the DC bus,
a first common mode capacitor connected between a positive rail of the DC bus and a common connection point, and
a second common mode capacitor connected between a negative rail of the DC bus and the common connection point, wherein the common connection point for the common mode filter for the second motor drive is electrically connected to the ground connection in the second motor drive.

8. The system of claim 6 further comprising a power interface module, the power interface module comprising:
a network interface having:
an input operative to receive a data packet from an industrial network connected to the input, and
an output operative to transfer the data packet from the input to the communication cable in the first cable; and
a DC bus receiving the DC voltage from the rectifier front end and transmitting the DC voltage to the first cable.

9. A cable for reducing electrical noise with distributed motor drives, the cable comprising:
an insulating jacket extending between a first end and a second end of the cable, the insulating jacket defining an outer periphery of the cable;
at least one power conductor extending between the first end and the second end of the cable;
a ground conductor extending between the first end and the second end of the cable; and
a communication cable extending between the first end and the second end of the cable, the communication cable further comprising a shield electrically connected to the ground conductor at the first end and the second end of the cable.

10. The cable of claim 9 wherein the ground conductor extends adjacent to the communication cable within the cable.

11. The cable of claim 9 wherein the communication cable is a four-pair Ethernet cable.

12. The cable of claim 9 further comprising a common mode core around the outer periphery of the cable.

13. The cable of claim 9, wherein the at least one power conductor includes a first DC bus conductor and a second DC bus conductor.

14. The cable of claim 13, wherein:
the first DC bus conductor comprises:
an insulating first conductor jacket defining an outer periphery of the first DC bus conductor, and
at least one first conductive wire within the first conductor jacket;
the second DC bus conductor comprises:
an insulating second conductor jacket defining an outer periphery of the second DC bus conductor, and
at least one second conductive wire within the second conductor jacket; and
the ground conductor comprises:
an insulating third conductor jacket defining an outer periphery of the ground conductor, and
at least one third conductive wire within the third conductor jacket, and wherein the cable has no overall braided shield to enclose the first DC bus conductor, the second DC bus conductor, the ground conductor, and the communication cable.

15. A method for reducing electrical noise with distributed motor drives, the method comprising the steps of:
electrically connecting a shield for a communication cable within each hybrid cable, selected from a plurality of hybrid cables, to a ground conductor within the hybrid cable, wherein the shield is electrically connected to the ground conductor at a first end and a second end of the hybrid cable;
electrically connecting a first distributed motor drive to a DC power source with a first hybrid cable, selected from the plurality of hybrid cables; and
electrically connecting a second distributed motor drive to the first distributed motor drive with a second hybrid cable, selected from the plurality of hybrid cables, wherein:

each hybrid cable further comprises:

an insulating jacket extending between the first end and the second end of the hybrid cable, the insulating jacket defining an outer periphery of the hybrid cable, at least one power conductor extending between the first end and the second end of the hybrid cable, and no overall shield within the hybrid cable to surround the at least one power conductor, the ground conductor, and the communication cable.

16. The method of claim 15 further comprising the steps of:

circulating a first portion of common mode current within a first conductive loop defined, at least in part, by the shield and ground conductor;

circulating a second portion of the common mode current within a first common mode filter in the first distributed motor drive; and circulating a third portion of the common mode current within a second common mode filter in the second distributed motor drive.

17. The method of claim 15 further comprising the step of connecting an external common mode core around each of the plurality of hybrid cables.

18. The method of claim 15 wherein the ground conductor extends adjacent to the communication cable within the cable.

19. The method of claim 15 further comprising the steps of:

converting an AC voltage to a DC voltage with a rectifier front end; and transmitting the DC voltage to the first hybrid cable, wherein the rectifier front end is the DC power source.

20. The method of claim 19 further comprising the steps of:

transmitting the DC voltage from the rectifier front end to the first hybrid cable via a power interface module;

receiving a data packet from an industrial network with the power interface module; and transmitting the data packet from the power interface module to the first distributed motor drive via the communication cable in the first hybrid cable.

* * * * *